United States Patent
Adamson et al.

(10) Patent No.: US 7,009,576 B2
(45) Date of Patent: Mar. 7, 2006

(54) RADIO FREQUENCY ANTENNA FOR A TIRE AND METHOD FOR SAME

(75) Inventors: John David Adamson, Simpsonville, SC (US); Charles Edward Kelly, Little River, SC (US); Cameron Earl Smith, Greenville, SC (US); Cal Moreland, Greer, SC (US)

(73) Assignee: Michelin Recherche et Technique S.A., (CH)

( * ) Notice: Subject to any disclaimer, the term of this patent is extended or adjusted under 35 U.S.C. 154(b) by 135 days.

(21) Appl. No.: 10/807,908

(22) Filed: Mar. 24, 2004

(65) Prior Publication Data

US 2004/0252072 A1    Dec. 16, 2004

Related U.S. Application Data

(63) Continuation-in-part of application No. 10/775,623, filed on Feb. 10, 2004, which is a continuation of application No. PCT/US02/38411, filed on Dec. 3, 2002, which is a continuation-in-part of application No. PCT/US02/18411, filed on Jun. 11, 2002.

(51) Int. Cl.
  *H01Q 1/40* (2006.01)
(52) U.S. Cl. ............... 343/873; 340/572.5; 156/110.1; 156/123; 152/152.1
(58) Field of Classification Search ............... 343/702, 343/873; 156/110.1, 123; 152/152.1, 450; 340/572.5, 572.1, 572.8
See application file for complete search history.

(56) References Cited

U.S. PATENT DOCUMENTS

| 4,911,217 | A |   | 3/1990 | Dunn et al. |
|---|---|---|---|---|
| 5,181,025 | A | * | 1/1993 | Ferguson et al. ...... 340/870.21 |
| 5,348,067 | A | * | 9/1994 | Myatt ...................... 152/152.1 |
| 5,448,110 | A | * | 9/1995 | Tuttle et al. ................. 257/723 |
| 5,500,065 | A |   | 3/1996 | Koch et al. |
| 5,562,787 | A | * | 10/1996 | Koch et al. ..................... 156/64 |
| 5,977,870 | A | * | 11/1999 | Rensel et al. ................ 340/447 |
| 6,078,791 | A | * | 6/2000 | Tuttle et al. ............... 455/90.1 |
| 6,121,880 | A | * | 9/2000 | Scott et al. .............. 340/572.5 |
| 6,147,659 | A |   | 11/2000 | Takahashi et al. |
| 6,365,440 | B1 | * | 4/2002 | Feil ............................ 438/125 |
| 6,724,301 | B1 | * | 4/2004 | Ginman et al. ............. 340/447 |
| 6,838,773 | B1 | * | 1/2005 | Kikuchi et al. ............. 257/773 |
| 6,888,509 | B1 | * | 5/2005 | Atherton ..................... 343/718 |
| 2005/0093761 | A1 | * | 5/2005 | King et al. ................. 343/873 |

FOREIGN PATENT DOCUMENTS

| WO | WO 03105509 | 6/2002 |
|---|---|---|
| WO | WO 03105511 | 6/2002 |

* cited by examiner

*Primary Examiner*—Tan Ho
(74) *Attorney, Agent, or Firm*—Dority & Manning, P.A.

(57) ABSTRACT

A radio frequency antenna for embedding within a conductive, dielectric material (such as tire rubber) is provided along with a method of embedding a radio frequency antenna in such a material. For very high frequency transmission, improved communication ranges are provided along with improvements in both antenna processing and tuning.

25 Claims, 2 Drawing Sheets

RADIO FREQUENCY ANTENNA FOR A TIRE AND METHOD FOR SAME

PRIORITY CLAIM

This application is a continuation-in-part of application of U.S. application Ser. No. 10/775,623, pending, filed Feb. 10, 2004, which is a continuation of PCT/US02/38411, filed Dec. 3, 2002 (designating the U.S.), which is a continuation-in-part of PCT/US02/18411, filed Jun. 11, 2002 (designating the U.S.), for which the benefits thereof are hereby claimed.

TECHNICAL FIELD OF THE INVENTION

The present invention provides a radio frequency antenna for embedding within a conductive, dielectric material (such as tire rubber), and a method of embedding a radio frequency antenna in a conductive, dielectric material.

BACKGROUND OF THE INVENTION

Electronic devices integrated with a tire can provide functions such as identification and tracking during manufacture, distribution, and use. These electronics can also provide for measurement of physical parameters such as pressure and temperature during use of the tire. Many systems utilize radio frequency communication between the tire and an external monitoring or interrogating device. A radio frequency communication link requires one or more antennas.

There are available systems that mount to a surface of the tire or the wheel, or are incorporated in the tire inflation valve. An electronic device and antenna attached directly to a surface of the tire or embedded in a tire structure is desirable as providing a permanent, tamper-proof integration. An antenna in direct contact or embedded in the tire, however, presents difficulties. Radio frequency energy travels along the surface of the antenna. The antenna must radiate radio frequency through the surrounding elastomeric materials from which tires are typically constructed. However, such materials are usually electrically conductive and have a relatively high dielectric constant, typically 3 or greater. Conductive material in contact with an antenna tends to dissipate the radio frequency energy traveling on the antenna surface. In addition, conductive dielectric material in contact with an antenna allows radio frequency current to pass between the two adjacent feed points of the antenna, also dissipating radio frequency energy. The problem of dissipation increases with the frequency, and is particularly troublesome at or above very high frequency (130 MHz) operation. Furthermore, placement of the antenna within a dielectric material such as tire rubber causes significant changes in the resonance and impedance of the antenna, making the antenna appear longer from an electrical standpoint than when in free air. As a result, a correction must be made by either shortening the antenna or by adding an appropriate reactance.

Finally, physical problems are also encountered when embedding or otherwise placing an antenna in direct contact with a tire. For example, the antenna, typically a metallic element, must adhere to the rubber material to secure it in place. Further, the antenna material must withstand the cyclic stresses in the functioning tire.

SUMMARY OF THE INVENTION

Objects and advantages of the invention will be set forth in part in the following description, or may be obvious from the description, or may be learned through practice of the invention.

The present invention provides a radio frequency antenna for embedding within a conductive dielectric material (such as tire rubber), and a method of embedding a radio frequency antenna in a conductive, dielectric material. The present invention is particularly effective for very high frequency transmission and results in improved communication ranges. Improvements in both antenna processing and tuning are also provided by the present invention.

In one exemplary embodiment, a radio frequency device for integration with conductive, dielectric materials is provided. The device includes a radio component for transmitting radio signals, receiving radio signals, reflecting radio signals, or a combination thereof. An antenna is connected to the radio component. An adhesive coating is provided that substantially covers at least the antenna and may also cover the radio component if needed. An insulating layer is attached to the antenna by the adhesive coating. The insulating layer is configured to insulate at least the antenna from the conductive, dielectric materials and may also be configured to insulate the radio component as well. The insulating layer has a relative dielectic constant less than the relative dielectric constant of the conductive, dielectric materials. In certain embodiments, the insulating layer is configured so that it has a relative dielectric constant of about 6 or less at operating frequency. A variety of materials may be used for the insulating layer; a silica reinforced elastomer is one such material that may be selected for its construction. Different thicknesses for the insulating layer may be utilized; an after-cure thickness of at least 0.3 mm for the insulating layer is preferred. In certain embodiments, the insulating layer is configured such that it provides a dielectric loss of about 0.6 or less at operating frequency. In still other embodiments of the present invention, the insulating layer is configured such that it has a dielectric loss of about 0.6 or less at operating frequency, a surface resistivity of at least about $10^{12}$ ohms*cm, and a volume resistivity of at least about $10^{13}$ ohms. The present invention may be used with the conductive, dielectric materials found in a tire. In such case, the insulating layer is configured for being adhered to the tire or may be configured for embedding within the materials of the tire. Although other operating frequencies are within the scope of the present invention, in certain embodiments, the present invention includes a radio component for operation at a frequency of at least 130 MHz.

In another exemplary embodiment, a tire having a radio frequency device integrated into the tire is provided. The radio frequency device includes a radio component for transmitting radio signals, receiving radio signals, reflecting radio signals, or a combination thereof. An antenna is connected to the radio component. An adhesive coating is used to substantially cover at least the antenna and may also cover the radio component if desired. An insulating layer is attached to the antenna by the adhesive coating. The insulating layer is configured to insulate at least the antenna from the tire and may also be configured to insulate the radio component from the tire. The insulating layer has a relative dielectic constant less than the relative dielectric constant of at least a portion of the tire that is proximate to the antenna when the device is used with the tire.

The present invention also provides a method for assembling a radio frequency antenna for use with conductive, dielectric materials such as are typically found in tires. In one exemplary method of the present invention, a process for creating a radio frequency device for use with a tire is provided that includes the following steps. A radio component is provided for transmitting radio signals, receiving radio signals, or both. An antenna is connected to the radio component. An adhesive is used to coat at least the antenna and, where desired, may also be used to coat the radio component. An insulating layer is applied to the antenna and attached by the adhesive coating. The insulating layer is configured to insulate at least the antenna from the tire and may also be configured to insulate the radio component from the tire. The insulating layer is selected to have a relative dielectric constant less than the relative dielectric constant of the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DETAILED DESCRIPTION

Figure 1:
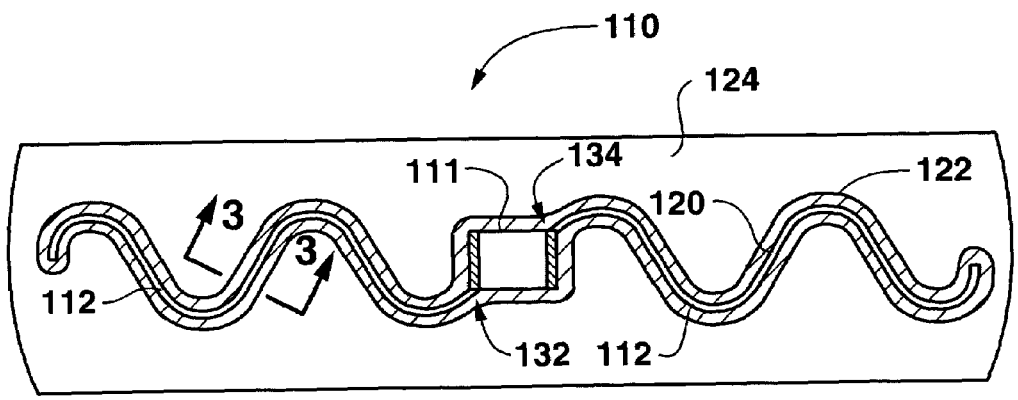
FIG. 1 is a schematic of an electrical device having an antenna in accordance with an exemplary embodiment of the present invention.

Illustrated in FIG. 1 is an exemplary embodiment of an insulated radio frequency device 110 in a tire 114 (FIG. 2) according to the present invention. Device 110 includes a radio component 111 and an antenna 112. Device 110 may be an identification or tracking device, such as may be used in manufacturing, distribution, and sales activities. Device 110 may also be or include a monitoring device for measuring temperature, pressure or other physical parameters in tire 114 during operation. For example, antenna 112 in device 110 may be used to transmit, receive, and/or reflect information to or from an external device by radio frequency. As another example, antenna 112 may also serve to receive energy from an interrogation device external to tire 114. Such radio devices 110 may operate as receivers, transmitters, transponders or reflectors, and, because the antenna of the invention is useful for all these devices, in the following description, the term "radio frequency device" is intended to be inclusive.

Figure 2:
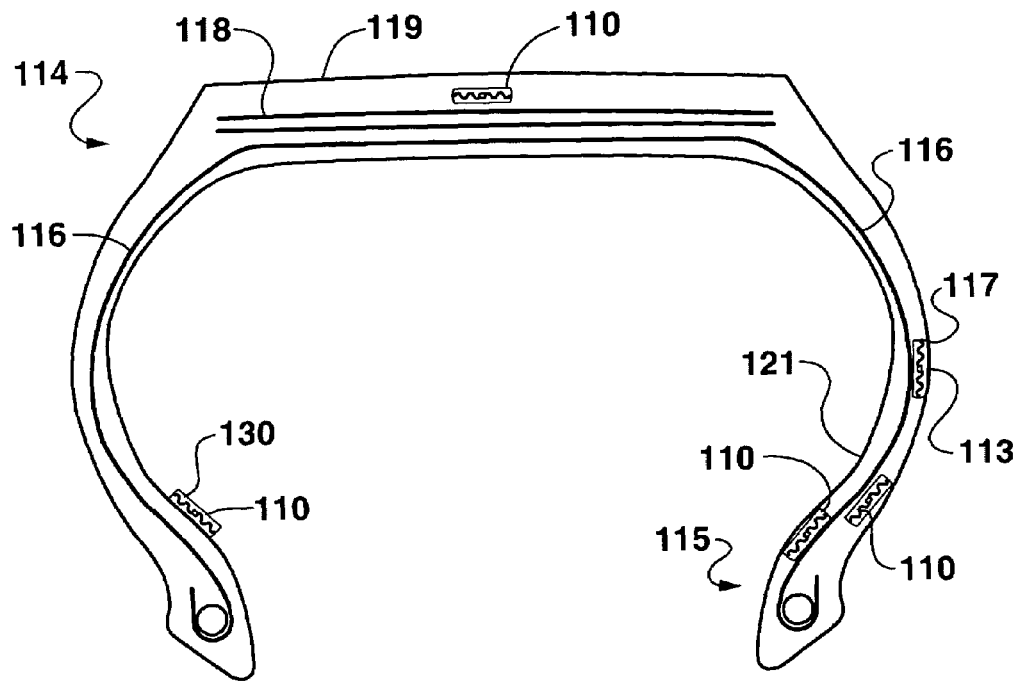
FIG. 2 is a sectional view of a tire showing alternative placements for an electrical device with an antenna in accordance an exemplary embodiment of the present invention.

As shown in FIG. 2, advantageously, device 110 may be positioned in a number of different places in tire 114. By way of example, device 110 may placed in tread 119, near bead 115, or at tire equator 113. A single tire 114 may include one or several such devices 110, for example, if it is desired to monitor physical parameters at different locations in tire 114 or to monitor different parameters. Device 110 may be formed as patch 130, which is adhered to a surface of tire 114. Alternatively, device 110 may be embedded in the structure of tire 114 or layered under rubber material forming the internal surface of tire 114. For example, radio frequency device 110 may be positioned between the carcass ply 116 and inner liner 121, between carcass ply 116 and the sidewall 117, and/or between belt package 118 and the tread 119. By "integrated" the inventors refer to any of these described techniques for incorporating device 110 with antenna 112 and radio component 111 in a tire.

Materials used in the construction of a tire, such as tire rubber, are generally electrically conductive, usually as a result of carbon black but also sometimes as a result of other reinforcing fillers. Direct contact between a radio frequency antenna and tire rubber material is thus deleterious to the ability of the antenna to transmit energy. Radio frequency energy travels along the surface of an antenna, in the so-called "skin effect." Conductive material in contact with the surface of the antenna tends to dissipate the energy through eddy currents. In addition, this conductive dielectric material also allows radio frequency energy to pass between the two adjacent feed points 132 and 134 of the antenna, which also dissipates energy. By way of example, the rubber typically used in the sidewalls of a tire may have a dielectric constant as high as 12. The result is a decrease in the effective transmission distance of the antenna. The inventors found that a device comprising a 915 MHz RFID chip having an antenna with a half-wavelength dipole length of 83 mm had a transmission range of 42 inches in air. When embedded in conventional tire rubber, however, the device had a transmission range of only 4 inches.

To overcome the loss of effective range, a suitable material is required to insulate the antenna from the high dielectric and conductive materials of the tire construction. In a previously filed priority application owned by applicants' assignee, U.S. application Ser. No. 10/775,623, filed Feb. 10, 2004, which is hereby incorporated by reference in its entirety, therein described was the discovery of an improvement in transmission by providing antenna 112 with a single layer of an insulating material between antenna 112 and the elastomeric material from which tire 114 is constructed. In at least one exemplary embodiment so described, the insulating material was formed from a coating at least 0.02 mm thick in the uncured state as measured perpendicular to antenna 112. This thickness provides sufficient spacing between the conductive elastomeric material of tire 114 and antenna 112 to avoid bleed-through discharges to the elastomeric material. For the embodiment previously so described, a coating material was indicated having a dielectric constant less than that of the elastomeric material used for the construction of tire 114, and preferably less than 3. Also indicated was a coating material preferably with a surface resistivity of at least $10^{12}$ ohms/cm$^2$, a volume resistivity of at least $10^9$ ohms/cm$^3$, and a dissipation factor less than 0.03. Materials useful for forming such coating material include electrical shrink tubing, thermoplastic polycarbonate, butadiene rubber, low carbon rubber (low carbon being defined to be a rubber mixture having less than 10% carbon black by weight), an isocyanate-based rubber to metal adhesive such as Chemlok (brand) TS3604-50 adhesive (available from Lord Corporation, Chemical Products Division, 2000 West Grand View Boulevard, Erie, Pa.), polyethylene, insulating varnish, epoxy, TPE cellulose acetate, polypara-xylylene (commonly known as "parylene"), and insulating polyester varnish. These materials include certain advantages, including the ability to apply at the desired thickness and good adherence with potential antenna materials (such as brass or steel, for example). For at least one exemplary embodiment, a coating of the appropriate materials with a thickness of at least 0.02 mm is described in the previously filed priority application as sufficient to obtain a significant gain in read range, with a thickness of at least 0.1 mm being preferred.

In the present invention, applicants discovered an additional approach for insulating an antenna element from a tire that provides improvements in antenna tuning and processing. More specifically, the present invention allows for use of an insulating material having a relative dielectric constant sufficiently less than the materials used for construction of the tire such that the antenna's signal loss is not unacceptably impaired. For example, using the present invention, a relative dielectric constant of as high as 6 or less at operating frequencies may be used. In general, as used with a tire, operating frequencies are usually in the range of at least 130 MHz.

For purposes of the appended claims and description herein, the following definitions are used:

permitivity=e'+je"

relative dielectric constant=e'/$e_o$ dielectric loss=e"/$e_o$

As used herein, $e_o$ is the permitivity of free space and e" is the dielectric loss of a given material.

Figure 3:
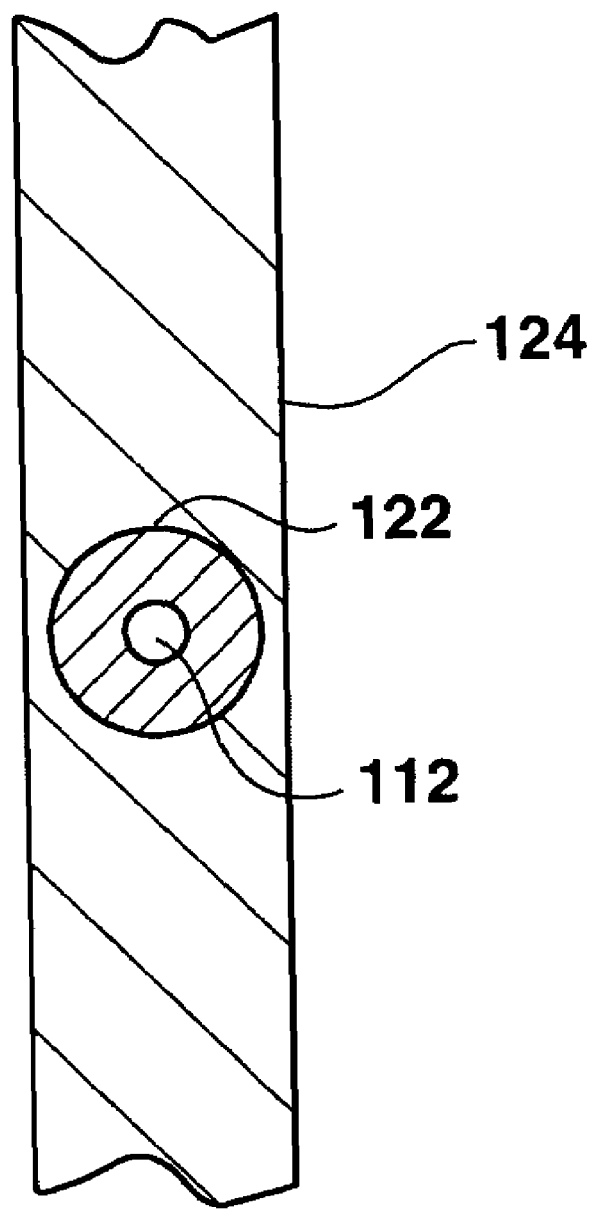
FIG. 3 is a cross-sectional view of the exemplary embodiment of FIG. 1 taken along line 3—3.

Returning to the device 110 and specifically to FIG. 1 and FIG. 3, as an alternative to a single layer of insulating material, a relatively thin, adhesive coating or layer 122 is applied to antenna 112. Surrounding the coated antenna 112 is an insulating layer 124 having a relative dielectric constant that is sufficiently less that the relative dielectric constant of the surrounding material of tire 114 such that the effective transmission range of antenna 112 is not unacceptably impaired for the desired application and operating frequency. Preferably, insulating layer 124 has a dielectric constant of about 6 or less. Additionally and preferably, insulating layer 124 has a surface resistivity equal to or greater than about $10^{12}$ ohms*cm and a volume resistivity equal to or greater than about $10^{13}$ ohms. Using the teachings disclosed herein, one of ordinary skill in the art will understand that materials having other relative dielectric constants and resistivity values may be used in accordance with the present invention.

By way of example only, adhesive coating 122 may be constructed from an adhesive manufactured by Lord Corporation under the name Chemlok 8210, which is applied using a primer, Chemlok 8007. In such case, layer 122 can be applied relatively thin at only 0.1 mm approximately in thickness. In addition, and by way of example only, insulating layer 124 may be constructed from a silica reinforced elastomer having a relative dielectric constant of about 4 or less, a surface resistivity equal to or greater than about $10^{12}$ ohms*cm, and a volume resistivity equal to or greater than about $10^{13}$ ohms. Using these materials as described, the after-cure thickness of the silica reinforced elastomer around antenna 112 (at the thinnest point) should be at least 0.3 mm. Constructing device 110 as described and using these exemplary materials, an acceptable transmission range and a dielectric loss of only about 0.2 or less can be achieved at operating frequencies. Using the teachings disclosed herein, one of ordinary skill in the art will appreciate that a variety of other materials may be used for coating 122 and layer 124; the above examples are provided by way of explanation and not limitation of the present invention.

In one exemplary embodiment, a method to construct a device 110 in accordance with the present invention includes the steps of providing and connecting radio component 111 and antenna 112, coating component 111 and antenna 112 with an adhesive material 122, and then applying an insulating layer 124 to the adhesive coating 122. Depending upon the selection of materials for coating 122 and layer 124, an additional curing step may be used to provide bonding of coating 122 and insulating layer 124, and/or bonding between coating 122 and antenna 112 and radio component 111. If necessary, the device 110 can be optimized by trying various lengths for antenna 112 so as to tune the half-wavelength dipole length until the desired read range is realized. Alternatively, a net-work analyzer may used to determine the actual resonant frequency of antenna 112 embedded in the particular rubber to reduce the iterations required to find the optimum length.

The present invention, as described using the exemplary embodiment of device 110, provides numerous advantages and improvements. While antenna 112 is illustrated in FIGS. 1 through 3 as a sinusoidal curve, antenna 112 may also be constructed from a helical spring. In such case, insulating layer 124 is applied to antenna 112 such that the space in the center of the helix is occupied by layer 124. Such a configuration offers improved transmission and tuning capabilities as compared to a configuration where relatively conductive materials having a high dieelectric constant (such as tire rubber materials) are closely coupled to the antenna's reactive near field, which tends to detune the antenna and absorbs energy away.

Furthermore, because insulating layer 124 is providing the barrier between antenna 112 and the conductive dielectric material used in the construction of tire 114, the thickness of coating 122 can be reduced without sacrificing performance. Manufacturing is improved because coating 122 can generally be applied in a single step rather than multiple coatings to ensure thickness and complete coverage. Additionally, coating 122 need not necessarily be constructed from a nonconductive material because of insulating layer 124. As a result, the range of suitable materials that may be used for coating 122 is increased. Finally, where a silica-reinforced elastomer is used in the construction of insulating layer 124, such material has properties well suited for being integrated with tire 114. For example, the tackiness of this material facilitates the placement of device 110 within the structural components of the tire 114 and also facilitates the manufacturing of device 110 as a patch 130 for placement on the surface of tire 114. By way of example only, insulating layer 114 could be applied as sheets that "sandwich" device 110 in between to create a structure for embedding within tire 114 or for placement on its surface. A curing step or steps could then be used to bond tire 114, coating 122, and/or insulating layer 124. One of ordinary skill in the art, using the teachings disclosed herein, will appreciate that several methods could be used for the integration of device 110.

It should be appreciated by those skilled in the art that modifications and variations can be made to the device and method as described herein, without departing from the scope and spirit of the claims. It is intended that the invention include such modifications and variations as come within the scope of the appended claims and their equivalents.

What is claimed is:

1. A radio frequency device for integration with conductive, dielectric materials, said device comprising:

a radio component for transmitting radio signals, receiving radio signals, or both;

an antenna connected to said radio component;

an adhesive coating substantially covering at least said antenna; and, an insulating layer attached to said antenna by said adhesive coating, said insulating layer being configured to insulate at least said antenna from the conductive, dielectric materials, said insulating layer having a relative dielectic constant less than the relative dielectric constant of the conductive, dielectric materials.

2. A radio frequency device as set forth in claim 1, wherein said insulating layer has a relative dielectric constant about 6 or less at operating frequency.

3. A radio frequency device as set forth in claim 1, wherein said insulating layer is constructed from a silica reinforced elastomer.

4. A radio frequency device as set forth in claim 1, where said insulating layer has an after-cure thickness of at least 0.3 mm.

5. A radio frequency device as set forth in claim 1, wherein said insulating layer provides a dielectric loss of about 0.6 or less at operating frequency.

6. A radio frequency device as set forth in claim 1, wherein said insulating layer has a dielectric loss of about 0.6 or less at operating frequency, a surface resistivity of at least about $10^{12}$ ohms*cm, and a volume resistivity of at least about $10^{13}$ ohms.

7. A radio frequency device as set forth in claim 1, wherein the conductive, dielectric materials are present within a tire and said insulating layer is configured for being adhered to the tire.

8. A radio frequency device as set forth in claim 1, wherein the conductive, dielectric materials are present within a tire and said insulating layer is configured for being embedded within the tire.

9. A radio frequency device as set forth in claim 1, wherein said radio component operates at a frequency of at least 130 MHz.

10. A tire having a radio frequency device integrated therein, said radio frequency device comprising:
    a radio component for transmitting radio signals, receiving radio signals, or both;
    an antenna connected to said radio component;
    an adhesive coating substantially covering at least said antenna; and,
    an insulating layer attached to said antenna by said adhesive coating, said insulating layer being configured to insulate at least said antenna from said tire, said insulating layer having a relative dielectic constant less than the relative dielectric constant of at least a portion of said tire proximate to said antenna when used with said tire.

11. A tire as set forth in claim 10, wherein said insulating layer has a relative dielectric constant of about 6 or less at the operating frequency of said radio component.

12. A tire as set forth in claim 11, wherein said insulating layer comprises a silica reinforced elastomer.

13. A tire as set forth in claim 12, wherein said insulating layer has an after-cure thickness of at least 0.3 mm.

14. A tire as set forth in claim 13, wherein said insulating layer provides a dielectric loss of of about 0.6 or less at operating frequency.

15. A tire as set forth in claim 13, wherein said insulating layer provides a dielectric loss of of about 0.6 or less at operating frequency, a surface resistivity of at least about $10^{12}$ ohms*cm, and a volume resistivity of at least about $10^{13}$ ohms.

16. A tire as set forth in claim 13, wherein said radio component operates at a frequency of at least 130 MHz.

17. A method for assembling a radio frequency device for use with a tire, comprising the steps of:
    providing a radio component for transmitting radio signals, receiving radio signals, or both;
    providing an antenna connected to said radio component;
    coating at least said antenna with an adhesive; and
    applying an insulating layer to said antenna for attachment by said adhesive coating, said insulating layer being configured to insulate at least said antenna from the tire, said insulating layer having a relative dielectic constant less than the relative dielectric constant of the tire.

18. A method for assembling a radio frequency device for use with a tire as in claim 17, further comprising the step of integrating said insulating layer, antenna, and radio component with the tire.

19. A method for assembling a radio frequency device for use with a tire as in claim 17, further comprising the step of embedding said insulating layer, antenna, and radio component with the tire.

20. A method for assembling a radio frequency device for use with a tire as in claim 17, further comprising the step of attaching said insulating layer to the tire.

21. A method for assembling a radio frequency device for use with a tire as in claim 17, wherein the tire is constructed from elastomeric materials, and further comprising the step of tuning said antenna for the resonant frequency of said elastomeric materials.

22. A method for assembling a radio frequency device for use with a tire as in claim 17, wherein the tire is constructed from elastomeric materials, and further comprising the step of curing said insulating layer with said elastomeric materials.

23. A method for assembling a radio frequency device for use with a tire as in claim 22, wherein said insulating layer has a thickness of at least 0.3 mm after said curing step.

24. A method for assembling a radio frequency device for use with a tire as in claim 17, wherein said insulating layer has a relative dielectric constant of about 6 or less at operating frequency.

25. A method for assembling a radio frequency device for use with a tire as in claim 24, wherein said insulating later is comprised of a silica reinforced elastomer.

* * * * *